J. F. SCRIBNER.
PIPE BENDER.
APPLICATION FILED MAR. 12, 1917.
1,247,728.
Patented Nov. 27, 1917.
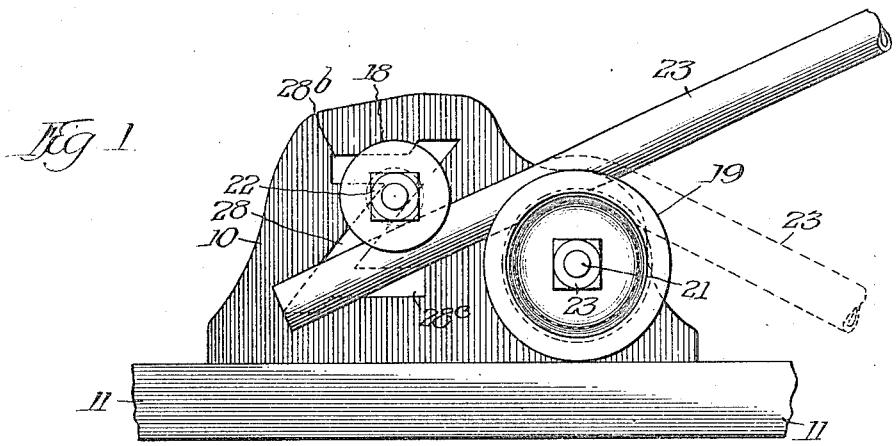
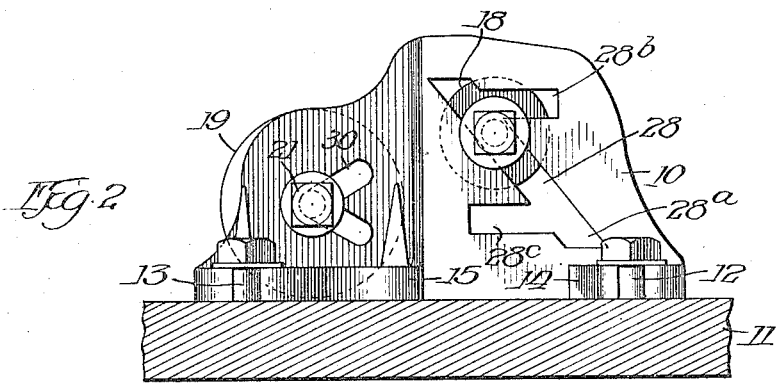
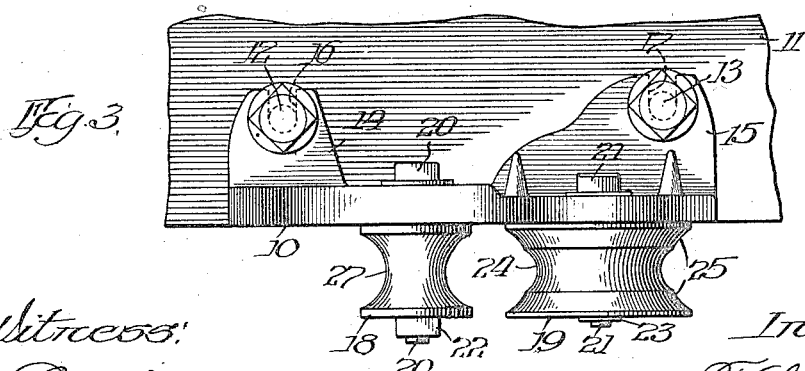
Witness:
G. W. C. Durion
Inventor
James F. Scribner
By Luther Johns Atty.

UNITED STATES PATENT OFFICE.

JAMES F. SCRIBNER, OF CHICAGO, ILLINOIS, ASSIGNOR TO UNIVERSAL HEADLIGHT COMPANY, OF CHICAGO, ILLINOIS, A CORPORATION OF ILLINOIS.

PIPE-BENDER.

1,247,728.  Specification of Letters Patent.  Patented Nov. 27, 1917.

Application filed March 12, 1917. Serial No. 154,136.

*To all whom it may concern:*

Be it known that I, JAMES F. SCRIBNER, a citizen of the United States, and a resident of the city of Chicago, in the county of Cook and State of Illinois, have invented certain new and useful Improvements in Pipe-Benders, of which the following is a specification.

My invention relates to pipe bending devices, and more particularly to such as constitute a holding appliance for the pipe so that the pipe may be bent by a force exerted upon the pipe itself, as by a workman pulling upon the pipe so held. Its principal object is to provide a simple form of pipe bending tool, one of high efficiency, and one adapted to be used easily and expeditiously. Specific objects are the provision of adjusting means in tools of the character set forth whereby the device may be easily and quickly made to accommodate pipes of different sizes for giving them turns or bends of a specific form, and so adjusted for bending a given size of pipe according to a variety of turns or bends. Another specific object is to provide a device in which pipes of various sizes may be bent without materially destroying their cylindrical shape. Other objects and advantages will appear hereinafter.

In the accompanying drawings, which form a part of this specification, I have illustrated a preferred embodiment of these improvements, Figure 1 being a face view or side elevation of the device as it appears in use, Fig. 2 being a similar view of the reverse side of the tool, and Fig. 3 being a top plan of the same.

The plate 10 is preferably vertical when in use and is preferably secured close to the edge of a substantially fixed bench or horizontal support 11, as by means of the two bolts or lag screws 12 and 13. The flange-like feet 14 and 15, integral with the plate 10, are respectively provided with notches or recesses 16 and 17 for the bolts 12 and 13, by which construction a mere slight backward turning of the bolts mentioned enables the workman to remove the device readily from the bench or support, the device being as easily refixed in operative position when desired.

The plate-like main support 10 carries two projecting pipe-holding parts 18 and 19, which are preferably in the form of grooved spools axially bored or cored to receive bolts 20 and 21 provided respectively with nuts 22 and 23. In the majority of operations the spool 19 constitutes the forming member, or the one against which the pipe is bent, well illustrated in Fig. 1 where the pipe 23 is shown by dotted lines in a bent condition. The spool-like character of this member 19 enables it to be turned around on its axis for the use of various portions thereof should breakage of one of its flanges occur through accident or misuse, and it also provides a large number of places against which the bending pressure may be exerted in forming various bends, or according to some particular position of the fulcruming member, rest, or spool 18. The forming member 19 is channeled annularly and preferably with intermerging grooves 24 and 25 having radii of different lengths and different centers of curvature, as well illustrated in Fig. 3, a construction which I have found advantageous in avoiding kinking or flattening of pipes, during the bending operation, from those of relatively small diameter up to the largest within the capacity of a given size of the device. The spool 18 is also preferably provided with a curved annular groove, as 27, adapted to accommodate all sizes of pipes suitable to be bent on the spool 19.

The spool 18 is adjustable on the face of the plate or main support 10, the means of adjustment preferably comprising a slot-like opening as 28, preferably slanting from its lowermost portion at $28^a$ in a direction upward and toward the spool 19, and preferably having legs $28^b$ and $28^c$ substantially horizontally disposed and in the relative positions shown on the drawings, thus forming a substantially Z-shaped opening. The bolt 20 is adapted to move freely in the opening 28 and the extensions $28^b$ and $28^c$, it being only necessary to give the nut 22 a slight backward turn in order that the spool 27 may be positioned as desired within the limits of the opening 28 and its extensions, the nut 22 thereupon being tightened to render the device ready for use.

The spool 19 is adjustable in the V-shaped opening 30, Fig. 2, by retracting the nut 23, shifting the bolt 21, and again tightening the nut.

The great advantage of having the forming and fulcruming members adjustable, and so easily and readily adjustable, will be better appreciated when I point out that when it is desired to bend pipes of various sizes into a particular shape, or when it is desired to bend pipes of the same diameter into bends or turns of various forms or radii of curvature it is necessary to modify the distance between the fulcruming member 27 and the forming member 19 and to change the relation of these members to each other as to relatively higher or lower positions to get the best and most conveniently obtained results. In many instances numerous bends are made in the same pipe, such bends being of different radii and variously directed. Where one spool or the other can be thus quickly adjusted to accommodate the pipe or to provide the desired radius of bend a high degree of efficiency and universality of application is provided in a device which is exceedingly simple and easy of operation.

In this connection I desire to point out that in bending pipe, it is an exceedingly easy thing according to heretofore suggested devices to bend the same awry, that is, somewhat sidewise, and particularly where several bends occur in the same pipe. In such instances after bending the pipe it being usually necessary to lay it upon the floor and straighten it, so far as may be possible, with a heavy mallet, whereby it will lie substantially flat upon the floor at all of the bent portions thereof. In the present device the workman pulls or pushes directly downward upon the pipe in most instances and in other instances he pulls both directly toward himself and downward, when he is positioned directly in line with the plate 10, which is his normal position. These movements are the most natural for the workman to make accurately, and in making them he is guided not only by his sense of the vertical direction, but also by the two spools 18 and 19, it being comparatively easy to preserve a "sight" over the pipe and directly between the flanges of the spools. Where various bends are made in the same pipe it is a simple and easy act to sight over the already bent portions and then make a further bend in the pipe as desired. By placing the device at the edge of the work bench, portions of the pipe may extend substantially vertically or on a long diagonal toward the floor, there being thus ample room for all portions of the pipe in ordinary practice in all bending operations.

In some operations the spool 18 is used as the forming member, according to the character of the bend desired. This spool is preferably considerably smaller in diameter than the spool 19, and is therefore adapted to provide a sharper bend in the pipe. In many uses of the tool the pipe is bent slightly in successive steps, the pipe being slightly advanced or retracted as it is held against the fulcruming member before each successive bending pull or push upon the pipe. In this way a curve of practically any desired radius can be produced.

In my practice I make a form of the device in which the support 10 is horizontal instead of vertical and presenting the spools 18 and 19 in horizontal instead of in vertical planes, a variation which calls merely for a modification of the main support 10. The spools 18, 19, and the plate 10 with the integral feet 14 and 15 are ordinarily made of cast iron.

It will be apparent to persons skilled in the art that other modifications of the illustrated device may be made in details of construction and arrangement without departing from the spirit of this invention, and I contemplate all modifications thereof as fall within the scope of the appended claims.

I claim:

1. A bench tool characterized by means for holding a pipe whereby the operator may pull directly upon and bend the same, said means including an arcuate grooved forming member and a fulcruming member spaced apart and so arranged that the pipe may contact each of said members on substantially opposite sides of the pipe and whereby the pipe is free to be moved longitudinally and axially by the operator at all times so that new surfaces of the pipe will contact said members respectively, as for successive bending operations, said means also including a substantially flat plate adapted to be secured to the bench or the like, said members projecting from one side of said plate, said plate having a substantially Z-shaped slot-like opening, said fulcruming member being adjustably mounted in said opening, the parts of said opening being in such directions that said fulcruming member may be readily positioned nearer to and farther from said forming member and also into various up and down positions relative to the forming member when the plate is in a substantially vertical position.

2. A bench tool characterized by means for holding a pipe whereby the operator may pull directly upon and bend the same, said means including a substantially vertical plate adapted to be positioned flush with the edge of the bench and having means for securing the plate rigidly in such position, an arcuate grooved forming member and a fulcruming member spaced apart on one side of said plate and adapted to project beyond the edge of the bench and so arranged that the pipe may contact each of said members on substantially opposite sides of the pipe and whereby the pipe is free to be moved longitudinally and axially by the operator at all times so that new surfaces of the pipe will contact said members respectively, as for successive bending operations, said plate having a slot-like opening therethrough extending in upward and downward direction, one of said members being adjustably mounted in said opening whereby it may be moved and held securely in various positions relative to the other member.

3. A bench tool characterized by means for holding a pipe whereby the operator may pull directly upon and bend the same, said means including an arcuate grooved forming member of relatively large radius and a fulcruming member of relatively small radius, said members being spaced apart and so arranged that the pipe may contact each of said members on substantially opposite sides of the pipe and whereby the pipe is free to be moved longitudinally and axially by the operator at all times so that new surfaces of the pipe will contact said members respectively, as for successive bending operations, said means also including a substantially flat plate having means whereby it may be secured substantially vertical at the edge of the bench or the like with said members projecting beyond such edge, said plate having a slot-like opening therein, said fulcruming member being adjustably mounted in said opening, said opening having such directions that the fulcruming member may be moved into various up and down positions and also nearer to and farther from said forming member.

JAMES F. SCRIBNER.

Copies of this patent may be obtained for five cents each, by addressing the "Commissioner of Patents, Washington, D. C."